US006012864A

United States Patent [19]
Asami

[11] Patent Number: 6,012,864
[45] Date of Patent: Jan. 11, 2000

[54] INK FOLLOWER COMPOSITION FOR BALLPOINT PEN AND BALLPOINT PEN USING THE SAME

[75] Inventor: Hideaki Asami, Aichi, Japan

[73] Assignee: The Pilot Ink Co., Ltd., Aichi, Japan

[21] Appl. No.: 08/802,442

[22] Filed: Feb. 18, 1997

[30] Foreign Application Priority Data

Feb. 19, 1996 [JP] Japan .................................... 8-056724

[51] Int. Cl.[7] ............................ B43K 7/08; C09D 11/00
[52] U.S. Cl. ........................................ 401/142; 106/31.13
[58] Field of Search .................................... 401/141, 142; 106/31.13

[56] References Cited

U.S. PATENT DOCUMENTS

| | | | |
|---|---|---|---|
| 3,074,380 | 1/1963 | Polishuk | 401/142 X |
| 3,656,857 | 4/1972 | Seregely | 401/142 |
| 4,416,790 | 11/1983 | Schurmann et al. | 252/62 |
| 4,671,691 | 6/1987 | Case et al. | 401/142 |
| 5,348,989 | 9/1994 | Shiraishi | 401/142 X |

FOREIGN PATENT DOCUMENTS

| | | | |
|---|---|---|---|
| 203462 | 9/1955 | Australia | 401/142 |
| 499791 | 7/1952 | Belgium | 401/142 |
| 944052 | 6/1956 | Germany | 401/142 |
| 57-200472 | 12/1982 | Japan | C09K 3/00 |
| 7-17872 | 3/1995 | Japan | C09D 11/18 |

*Primary Examiner*—Steven A. Bratlie
*Attorney, Agent, or Firm*—Sughrue, Mion, Zinn, Macpeak & Seas, PLLC

[57] ABSTRACT

An ink follower composition for ballpoint pens which comprises a hardly volatile liquid and aluminum silicate added therein. The ink follower composition for ballpoint pens of the present invention has very little temperature dependence of viscosity, undergoes no liquid separation due to changes in temperature, etc. and therefore follows ink while retaining the interface with the ink and preventing the ink from adhering to the inner wall of the ink tube until the ink runs out.

8 Claims, 2 Drawing Sheets

INK FOLLOWER COMPOSITION FOR BALLPOINT PEN AND BALLPOINT PEN USING THE SAME

FIELD OF THE INVENTION

This invention relates to an ink follower composition for a ballpoint pen and a ballpoint pen using the same. In particular, in a ballpoint pen having a ball point tip and an open-ended ink container containing middle- to high-viscosity or shear-thinning ink (gelatinous ink), the present invention relates to an ink follower composition for ballpoint pen which is filled at the end of ink in said open-ended ink container.

BACKGROUND OF THE INVENTION

As such an ink follower composition for ballpoint pen (also referred to as "liquid stopper" or "a back flow preventing composition"), a mixture of a mineral oil and a metallic soap (i.e., grease) has been used in ballpoint pens using high-viscosity oily ink.

When applied to ballpoint pens using middle-viscosity oily ink or shear-thinning aqueous ink, the ink follower applicable to the high-viscosity oily ink does not follow the ink satisfactorily or fails to prevent the ink from flowing backward because of its large viscosity change with temperature. Hence, various gelatinous polybutene-based ink followers comprising a hardly volatile organic liquid, typically exemplified by liquid polybutene and a lipophilic gelatinizer added therein have been proposed and put to practical use broadly in ballpoint pens using the aforementioned ink.

Conventional lipophilic gelatinizers include dibenzylidene sorbitol, tribenzylidene sorbitol (see an examined published Japanese patent application (kokoku) 1-10554, N-acylamino acid derivatives (see an unexamined published Japanese patent application (kokai) 57-200472, and clay which is surface-treated with an onium compound having a long-chain alkyl group (see an examined published Japanese patent application (kokoku) 7-17872 corresponding to U.S. Pat. No. 4,671,691).

However, if the polybutene-based ink follower has a low molecular weight or if the amount of the gelatinizer is small, there is a tendency that a part of the ink follower is separated (liquid separation) with time. While ballpoint pens having such a polybutene-based ink follower are allowed to stand for a long period of time with their tips upward as in the case where they are displayed for sale, the separated part of the ink follower, which has a smaller specific gravity than the ink, tends to rise along the inner wall of the ink tube and jam up at the tip of the ballpoint pen, which would result in poor start of writing.

On the other hand, if the polybutene in the follower has a high molecular weight, or if the gelatinizer is added in an increased amount, the ink follower that should follow the ink with the ink consumption tends to be too hard to follow or be adhered to the inner wall of the ink tube and decrease in amount as it moves with the ink consumption, resulting in adverse influences on various performance properties. Further, these unfavorable phenomena are easily influenced by temperature change. In other words, preparation of the polybutene-based ink follower, i.e., the molecular weight of polybutene and the amount of the gelatinizer to be added, should be delicately controlled, and the proper application of the polybutene-based ink follower has been difficult.

Another problem of the polybutene-based ink follower is that its viscous structure tends to be destroyed by the force imposed on charging in an ink tube in the production of ballpoint pens. It is hard to restore the once destroyed viscous structure, or the restoration requires a very long time, or the restored ink follower tends to have an increased viscosity over the initial one. These phenomena cause considerable reduction in writing performance of ballpoint pens.

The present invention is to eliminate the above-mentioned disadvantages of conventional ink followers for ballpoint pens. That is, an object of the present invention is to provide an ink follower composition for a ballpoint pen which has satisfactory properties of following a middle- to high-viscosity ink or shear-thinning ink, is hardly influenced by temperature change, and can be produced at good productivity and also to provide a ballpoint pen using such ink follower.

SUMMARY OF THE INVENTION

The present invention relates to an ink follower composition for a ballpoint pen which comprises a hardly volatile liquid and aluminum silicate added therein. The invention embraces an ink follower composition for a ballpoint pen in which the hardly volatile liquid is dimethyl silicone oil, methylphenyl silicone oil, alkyl-modified silicone oil or a mixture thereof; an ink follower composition for a ballpoint pen in which the hardly volatile liquid is polybutene, an α-olefin cooligomer or a mixture thereof; an ink follower composition for a ballpoint pen in which the aluminum silicate is added in a proportion of 0.1 to 10% by weight based on the total composition; an ink follower composition for a ballpoint pen in which the composition contains silica; and an ink follower composition for a ballpoint pen in which the composition has a 1-minute value of 25 to 50 mm as measured with a spreadmeter at about 20° C. Further, the present invention relates to a ballpoint pen comprising a middle- to high-viscosity ink or shear-thinning ink; a ball; a tip for holding said ball at a top end thereof and for discharging said ink from said top end portion; an ink container for containing said ink and for supplying said ink to said tip, said ink container communicating with a rear portion of said tip; and an ink follower comprising a hardly volatile liquid and aluminum silicate, said ink follower following said ink with consumption of said ink.

The ink follower is to be applied to the rear end of the ink after filling the ink in the ink container. It follows the movement of the ink as the ink is consumed so as to prevent ink from evaporation and from running backward even when the ballpoint pen is allowed to stand with its tip upward.

REFERENCE NUMERALS

Figure 1:
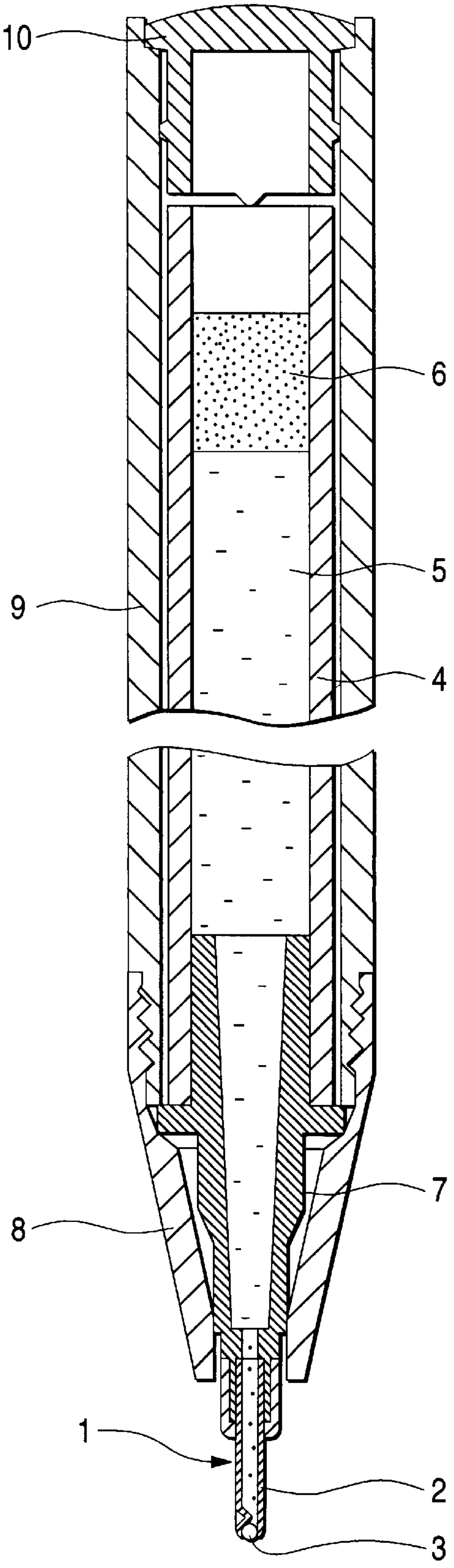
FIG. 1 shows a cross section of the ballpoint pen of the present invention.

1 . . . tip
2 . . . pipe
3 . . . ball
4 . . . ink tube
5 . . . ink
6 . . . ink follower
7 . . . connecting member
8 . . . top

9 . . . barrel

10 . . . stopper

DETAILED DESCRIPTION OF THE INVENTION

The hardly volatile liquid for use as a base oil of the ink follower of the invention includes silicone oils which has transparency, lubricating properties, heat resistance, and oxidation resistance and is not miscible with general oily ink as well as aqueous ink, such as dimethyl silicone oil, methylphenyl silicone oil, and alkyl-modified silicone oil (e.g., KF410 available from Shin-Etsu Chemical Industries Co., Ltd., TSF4420 available from Toshiba Silicone Co., Ltd., and SH203, SH230 and SF8416 available from Dow Corning Toray Silicone Company, Limited).

Addition of the aforementioned lipophilic gelatinizer is not effective on these silicone oils in sufficiently increasing the viscosity.

The inventors have extensively studied on various gelatinizers seeking for a substance having a viscosity increasing effect on various silicone oils and, as a result, found that addition of aluminum silicate brings about sufficient increase in viscosity of silicone oil. The inventors also found that aluminum silicate gives sufficient viscosity in such other hardly volatile liquids such as polybutene and an α-olefin cooligomer (e.g., HC-100 and HC-150 available from Mitsui Petrochemical Industries Ltd.).

The following table 1 shows the viscosity increasing effect of aluminum silicate on the ink follower prepared by adding aluminum silicate in various hardly volatile liquids and the immiscibility of the ink follower with the ink.

TABLE 1

| Hardly Volatile Liquid | Viscosity-Increasing Effect of Aluminum Silicate | Immiscibility with ink |
|---|---|---|
| Dimethyl silicone oil | ○ | ○ |
| Methylphenyl silicone oil | ○ | ○ |
| Alkyl-modified silicone oil | ○ | ○ |
| Amino-modified silicone oil | Δ | ○ |
| carboxyl-modified silicone oil | Δ | ○ |
| Epoxy-modified silicone oil | Δ | ○ |
| Polyether-modified silicone oil | ○ | x |
| Fluorine-modified silicone oil | ○ | (○) |
| Polybutene | ○ | ▲ |
| α-olefin cooligomer | ○ | ▲ |

The symbols in the Table indicate the following standard.

Viscosity Increasing Effect:

○. . . Sufficient viscosity increasing effect is observed.

Δ. . . Although a little viscosity increasing effect is observed, addition in a final concentration of 10 wt % does not result in sufficient viscosity increase.

Immiscibility with ink:

○. . . Immiscible with either oily or aqueous ink for ballpoint pens.

(○) . . . Immiscibility with ink is graded ○, but the ink follower is heavier than ink (specific gravity: 1.26), sinking down into ink, and is unsuitable as an ink follower.

▲. . . Immiscible with aqueous ink but partly miscible with oily ink.

x . . . Partly miscible with both oily ink and aqueous ink for ballpoint pens.

As described above, a combination of dimethyl silicone oil, methylphenyl silicone oil or alkyl-modified silicone oil as alhardly volatile liquid and aluminum silicate has suitability as an ink follower for both aqueous and oily ballpoint pens. A combination of polybutene or an α-olefin cooligomer and aluminum silicate is suitable as an ink follower for aqueous ink ballpoint pens.

The hardly volatile liquid to be used has a kinematic viscosity of 500 to 20,000 cSt, preferably 1000 to 10,000 cSt, at about 20° C. If the kinematic viscosity is lower than 500 cSt, the ink follower too much depends on temperature for practical use. If the kinematic viscosity exceeds 20,000 cSt, the ink follower has poor properties of following ink. The kinematic viscosity may be measured by, for example, the method described in JIS K2283.

The above-described aluminum silicate is preferably added in an amount of 0.1 to 10% by weight based on the total composition. If the amount is less than 0.1% by weight, a sufficient viscosity increasing effect cannot be obtained, and oil tends to be separated. If the amount exceeds 10% by weight, the ink follower becomes too hard to follow ink, lacking suitability as an ink follower.

The viscosity of the above-described ink follower can be finely adjusted by the addition of hydrophilic or lipophilic silica, thus broadening applicability of the ink follower to various types of ink.

The hardness and flowability of an ink follower can be measured with a spreadmeter as a convenient means. An ink follower having a 1-minute value of 20 to 50 mm as measured with a spreadmeter at 20° C. exhibits suitable performance properties. Measurement of hardness using a spredmeter may be carried out in accordance with the method described in "*Shikizai no bunseki•shikenho handbook*" published by Maruzen, or the like.

The ink follower according to the invention can be used in combination with a known solid ink stopper.

The ink used in the invention includes conventional aqueous or oily inks.

The oily ink is preferably middle- to high-viscosity ink having a viscosity of 1 to 20 Pa·s, particularly 1 to 10 Pa·s. The aqueous ink to be used is preferably shear-thinning aqueous ink.

Coloring matter which can be used in the ink include dyes classified as solvent dyes according to Color Index.

Specific examples of solvent dyes are Valifast Black 3806 (C.I. Solvent Black 29), Valifast Black 3807 (a trimethylbenzylammonium salt of C.I. Solvent Black 29), Spirit Black SB (C.I. Solvent Black 5), Spiron Black GMH (C.I. Solvent Black 43), Valifast Red 1308 (a salt of C.I. Basic Red 1 and C.I. Acid Yellow 23), Valifast Yellow AUM (a salt of C.I. Basic Yellow 2 and C.I. Acid yellow 42), Spiron Yellow C2GH (an organic acid salt of C.I. Basic Yellow 2), Spiron Violet CRH (C.I. Solvent Violet 8-1), Valifast Violet 1701 (a salt of C.I. Basic Violet 1 and C.I. Acid Yellow 42), Spiron Red CGH (an organic acid salt of C.I. Basic Red 1), Spiron Pink BH (C.I. Solvent Red 82), Nigrosine Base EX (C.I. Solvent Black 7), Oil Blue 603 (C.I. Solvent Blue 5), and Neozapon Blue 808 (C.I. Solvent Blue 70).

Pigments can also be used. Useful pigments include inorganic pigments, such as carbon black, iron oxide, and ultramarine; organic pigments, such as azo pigments, anthraquinone pigments, condensed polyazo pigments, thioindigo pigments, metallic complex salts, phthalocyanine pigments, perinone pigments, perylene pigments, dioxazine pigments, and quinacridone pigments; and fluorescent pigments.

Particulate fluorescent pigments comprising a synthetic resin matrix having dispersed therein a fluorescent dye, pearl pigments, metallic pigments (gold or silver), light-storing pigments, white pigments (e.g., titanium oxide), and reversibly thermochromic encapsulated pigments are also useful.

These coloring matters are used either individually or as a mixture of two or more thereof and comprise from 3 to 40% by weight of the total ink composition.

The organic solvents used in the oily ink are preferably high-boiling organic solvents having a boiling point of 150° C. or higher at atmospheric pressure, such as benzyl alcohol, ethylene glycol monophenyl ether (phenyl glycol), benzyl glycol, dipropylene glycol monomethyl ether.

The solvents used in the shear-thinning aqueous ink include water and general-purpose water-miscible and water-soluble organic solvents, such as ethanol, isopropyl alcohol, glycerol, triethanolamine, diethanolamine, monoethanolamine, ethylene glycol, diethylene glycol, thiodiethylene glycol, polyethylene glycol, propylene glycol, ethylene glycol monomethyl ether, ethylene glycol monobutyl ether, ethylene glycol monomethyl ether acetate, sulfolane, 2-pyrrolidone, N-methyl-2-pyrrolidone, and dimethylformamide. The water-soluble organic solvent to be used in the present invention is selected according to the kind of the dissolution assistant for resins or according to the purposes, such as inhibition of ink drying.

Conventional materials known for providing shear-thinning properties can be used in the aqueous ink. Examples of such materials are xantham gum, welan gum, guar gum, locust bean gum and its derivatives, succinoglycan (organic acid-modified heteroglycan composed of a glucose unit and a galactose unit; average molecular weight: about 100 to 8,000,000), hydroxyethylcellulose, alkyl alginates, polymers mainly comprising an alkyl methacrylate (molecular weight: 100,000 to 150,000), glycomannan, thickening polysaccharides having a gelling property, extracted from seaweed, such as agar and carrageenan, and crosslinking acrylic acid polymers. These shear-thinning property imparting materials can be used either individually or as a mixture thereof.

The ink can contain various additives. For example, useful corrosion inhibitors include benzotriazole, tolyltriazole, dicyclohexylammonium nitrite, diisopropylammonium nitrite, and saponin. Useful antiseptics or antifungals include carbolic acid, sodium 1,2-benzothiazolin-3-one, sodium benzoate, sodium dehydroacetate, potassium sorbate, propyl p-hydroxybenzoate, and 2,3,5,6-tetrachloro-4-(methylsulfonyl)pyridine. Useful wetting agents include urea, nonionic surface active agents, sorbitol, mannitol, sucrose, glucose, reducing starch hydrolyzate, and sodium pyrophosphate. In order to improve penetrability of ink, fluorine type surface active agents or nonionic surface active agents may be used. In desired, water-soluble resins, such as polyvinylpyrrolidone, polyvinyl alcohol, water-soluble acrylic resins, and gum arabic, can be used for prevention of smearing or as a protective colloid for pigments.

The ink may also contain polymers having substantially no shear-thinning properties as a binder or for imparting water resistance. Polymers suitable for this use include linear polymers, e.g., polyvinyl alcohol, polyacrylic acid resins, and styrene-maleic acid resins.

The structure of the tip of ballpoint pens conventionally and generally employed can effectively be applied to the ballpoint pen of the present invention. Examples of useful tips include one comprising a metallic pipe with its point deformed inward by pressing to form a ball-bearing seat in which a rotating ball is held, one made of metal cut and shaped to have a ball-bearing seat, and one comprising a metallic pipe or made of metal by shaping in which a ball is pressed onto the point by means of a spring.

The ball to be used can be made of cemental carbides, stainless steel, ruby, ceramics, etc. and have a diameter of about 0.3 to 1.2 mm.

The ink container (e.g., ink tube) to contain the ink and the ink follower is preferably a molded article of thermoplastic resins, such as polyethylene, polypropylene, and polyethylene terephthalate, in view of prevention of evaporation of ink and productivity. A transparent, colored transparent, or semitransparent ink container makes it possible for the user to confirm the color or the residual amount of the ink and also produces a unique effect of design.

The ink tube can be connected to the tip either directly or via a connecting member.

The ballpoint pen of the present invention include the type in which an ink container as a refill is inserted into a barrel and the type in which ink is directly filled into the barrel as an ink container.

EXAMPLES

Ink followers were prepared according to the following compositions and used for evaluation. All ratios, parts, percents, and the like used herein are by weight.

Example 1

| | |
|---|---|
| Dimethyl silicone oil (KF-96, a product name of Shin-Etch Silicone Co., Ltd.; viscosity: 3,000 cSt) | 98 parts |
| Aluminum silicate (P-820, a product name of Degussa AG) | 2 parts |

The above components were uniformly dispersed in a disper for 30 minutes to prepare an ink follower composition for ballpoint pens.

The 1-minute value of the composition as measured with a spreadmeter at about 20° C. (hereinafter, referred to as "an SM value") was 35 mm.

Example 2

| | |
|---|---|
| Methylphenyl silicone oil (KF-50, a product name of Shin-Etsu Silicone Co., Ltd.; viscosity: 3,000 cSt) | 97.0 parts |
| Aluminum silicate (MOX170, a product name of Nippon Aerosil K.K.) | 2.0 parts |
| Silica (Aerosil 300, a product name of Nippon Aerosil K.K.) | 1.0 part |

The above components were uniformly dispersed in a disper for 30 minutes to prepare an ink follower composition for ballpoint pens. The SM value of the composition was 32 mm.

Example 3

| | |
|---|---|
| Alkyl-modified silicone oil (KF-410, a product name of Shin-Etsu Silicone Co., Ltd.; viscosity: 1,000 cSt) | 98.0 parts |
| Aluminum silicate (P-820, a product name of Degussa AG) | 1.0 part |
| Hydrophilic silica (Aerosil 200, a product name of Nippon Aerosil K.K.) | 1.0 part |

The above components were uniformly dispersed in a disper for 30 minutes to prepare an ink follower composition for ballpoint pens. The SM value of the composition was 40 mm.

Example 4

| | |
|---|---|
| Dimethyl silicone oil (KF-96, a product name of Shin-Etsu Silicone Co., Ltd.; viscosity: 3,000 cst) | 49.0 parts |
| Methylphenyl silicone oil (KF-50, a product name of Shin-Etsu Silicone Co., Ltd.; viscosity: 3,000 cSt) | 49.0 parts |
| Aluminum silicate (MOX 170, a product name of Nippon Aerosil K.K.) | 2.0 parts |

The above components were uniformly dispersed in a disper for 30 minutes to prepare an ink follower composition for ballpoint pens. The SM value of the composition was 35 mm.

Example 5

| | |
|---|---|
| Liquid polybutene (Polybutene HV-15, a product name of Nippon Oil Co., Ltd.; molecular weight: 540) | 97.0 parts |
| Aluminum silicate (P-820, a product name of Degussa AG) | 3.0 parts |

The above components were uniformly dispersed in a disper for 30 minutes to prepare an ink follower composition for ballpoint pens. The SM value of the composition was 37 mm.

Example 6

| | |
|---|---|
| Liquid polybutene (Polybutene HV-15, a product name of Nippon Oil Co., Ltd.; molecular weight: 540) | 96.0 parts |
| Aluminum silicate (P-820, a product name of Degussa AG) | 2.0 parts |
| Lipophilic silica (Aerosil R972, a product name of Nippon Aerosil K.K.) | 2.0 parts |

The above components were uniformly dispersed in a disper for 30 minutes to prepare an ink follower composition for ballpoint pens. The SM value of the composition was 36 mm.

Comparative Example 1

| | |
|---|---|
| Liquid polybutene (Polybutene HV-15, a product name of Nippon Oil Co., Ltd.; molecular weight: 540) | 99.5 parts |
| Tribenzylidene sorbitol (Gelol T, a product name of New Japan Chemical Co., Ltd.) | 0.5 part |

The above components were stirred under heating to dissolve the gelatinizer completely, followed by allowing to cool to prepare an ink follower composition for ballpoint pens.

Comparative Example 2

| | |
|---|---|
| Liquid polybutene (Polybutene HV-35, a product name of Nippon Oil Co., Ltd.; molecular weight: 750) | 99 parts |
| Acylated amino acid (GP-1, a product name of Ajinomoto Co., Ltd.) | 1 part |

The above components were stirred under heating to dissolve the gelatinizer completely, followed by allowing to cool to prepare an ink follower composition for ballpoint pens.

Comparative Example 3

| | |
|---|---|
| Liquid polybutene (Polybutene LV-15, a product name of Nippon Oil Co., Ltd.; molecular weight: 540) | 97 parts |
| Dextrin fatty acid ester (Leopearl KE, a product name of Chiba Seifun K.K.) | 3 parts |

The above components were uniformly dispersed in a disper for 30 minutes to prepare an ink follower composition for ballpoint pens.

Comparative Example 4

| | |
|---|---|
| Liquid polybutene (Polybutene HV-300, a product name of Nippon Oil Co., Ltd.; molecular weight: 1,350) | 99 parts |
| Acylated amino acid (GP-1, a product name of Ajinomoto Co., Ltd.) | 1 part |

The above components were stirred under heating to dissolve the gelatinizer completely, followed by allowing to cool to prepare an ink follower composition for ballpoint pens.

Comparative Example 5

| | |
|---|---|
| Liquid polybutene (Polybutene HV-35, a product name of Nippon Oil Co., Ltd.; molecular weight: 750) | 99 parts |
| Lipophilic silica (Aerosil R972, a product name of Nippon Aerosil K.K.) | 1 part |

The above components were uniformly dispersed in a disper for 30 minutes to prepare an ink follower composition for ballpoint pens.

Figure 2:
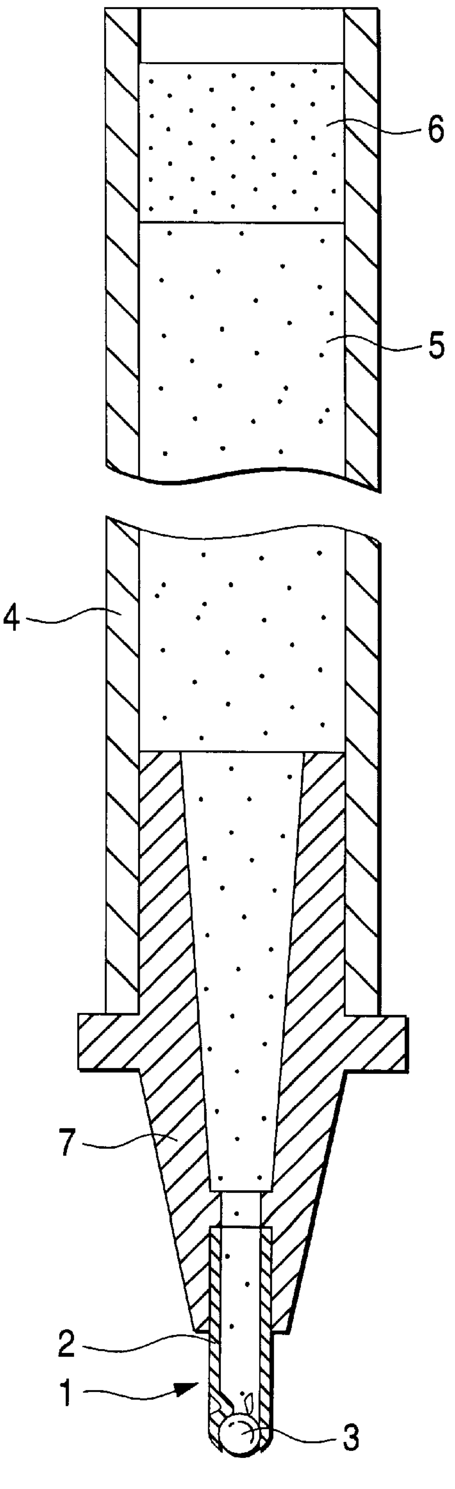
FIG. 2 is a cross section of a refill to be used in the ballpoint pen of FIG. 1.

Preparation of Ballpoint Pen:

Ballpoint pens having the structure described below were prepared and tested. FIG. 1 shows the ballpoint pen of the present invention. FIG. 2 shows a refill to be inserted into the barrel. Ink tube 4 is connected to tip 1 via connecting member 7. Top 8 is screwed on barrel 9, and stopper 10 is fitted into the open end of barrel 9. Ink tube 4 is filled with shear-thinning aqueous ink 5 having a viscosity of 100 mpa·s at 20° C. Ink follower 6 is applied to the rear end of the ink column.

(1) The ballpoint pen was set on a spiral writing tester, and a writing test was carried out under conditions of a writing angle of 70°, a load of 100 g, and a writing speed of 4 m/min. Evaluation was made in terms of whether the ballpoint pen can be used until it runs out of ink (running-out property), whether the ink follower follows the ink until running-out without destroying the ink/ink follower interface (ink following property), and whether the inner wall of the ink tube is stained with the ink after the ink follower passes by (wall staining).

(2) The tip of the ballpoint pen was tightly sealed with a rubber stopper, and the pen was allowed to stand with its tip upward at 50° C. for 1 month. Separation of the ink follower (liquid separation) and a back flow of the ink were observed.

(3) The tip of the ballpoint pen was tightly sealed with a rubber stopper, and the pen was allowed to stand with its tip upward at 50° C. for 1 month, the same writing test as in (1) above was conducted.

(4) The tip of the ballpoint pen was tightly sealed with a rubber stopper, and the pen was allowed to stand with its tip upward at 80° C. for 1 hour, the condition of the ink was observed.

(5) The ink follower was charged in a syringe and pressed out therefrom by pushing the plunger to apply pressure to the ink follower. Five minutes later, the viscosity of the ink follower was measured to examine any change in viscosity due to the pressure application.

The results of the tests are shown in Table 2 below.

TABLE 2

| | Writing Test | | | Liquid | Writing Test (50° C. × 1 month) | | Back | Change in Viscosity |
|---|---|---|---|---|---|---|---|---|
| Example No. | Running-out | Ink Following Property | Inner Wall Staining | Separation (50° C. × 1 month) | Running-out | Ink Following Property | flow (80° C. × 1 hour) | After Pressure Application |
| Example 1 | good | good | not observed | not observed | good | good | not observed | no change |
| Example 2 | good | good | not observed | not observed | good | good | not observed | no change |
| Example 3 | good | good | not observed | not observed | good | good | not observed | no change |
| Example 4 | good | good | not observed | not observed | good | good | not observed | no change |
| Example 5 | good | good | not observed | not observed | good | good | not observed | no change |
| Example 6 | good | good | not observed | not observed | good | good | not observed | no change |
| Comparative Example 1 | good | good | not observed | slightly separated | good | good | not observed | reduced |
| Comparative Example 2 | good | interface destroyed | not observed | separated | poor writ-ability | interface destroyed | not observed | reduced |
| Comparative Example 3 | good | good | not observed | separated | good | good | observed | reduced |
| Comparative Example 4 | good | reduction of ink follower | not observed | not observed | poor writ-ability | reduction of ink follower | not observed | reduced |
| Comparative Example 5 | good | reduction of ink follower | slightly stained | Back flow occurred | good | reduction of ink follower | observed | no change |

Since the ink follower composition for a ballpoint pen according to the present invention has very little temperature dependence of viscosity and does not undergo liquid separation with changes in temperature, etc., it functions as an ink follower that retains its interface with ink. In writing with the ballpoint pen of the present invention using the ink follower composition for a ballpoint pen, good performances can be achieved that the ink follower follows the movement of ink with the ink consumption while preventing ink from adhering to the inner wall of the ink tube and that this function lasts until the ink runs out.

Dimethyl silicone oil, methylphenyl silicone oil or alkyl-modified silicone oil used as a hardly volatile liquid is immiscible with either aqueous or oily ink and, when mixed with aluminum silicate, provides an ink follower which exhibits very little temperature dependence of viscosity. Further, the above ink follower hardly undergoes destruction of its viscous structure, and even if the viscous structure is destroyed, it is rapidly restored. Thus, the ink follower of the present invention is effective in preventing troubles in the production process of ballpoint pens and can provide ink followers and ballpoint pens assured of excellent writing performance.

While the invention has been described in detail and with reference to specific embodiments thereof, it will be apparent to one skilled in the art that various changes and modifications can be made therein without departing from the spirit and scope thereof.

This application is based on Japanese patent application 8-56724, filed on Feb. 19, 1996, incorporated herein by reference.

What is claimed is:

1. An ink follower composition for a ballpoint pen which comprises a hardly volatile liquid and aluminum silicate, wherein said hardly volatile liquid is selected from the group consisting of dimethyl silicone oil, methylphenyl silicone oil, alkyl-modified silicone oil and mixtures thereof, or is selected from the group consisting of polybutene, an α-olefin cooligomer and mixtures thereof.

2. The ink follower composition for a ballpoint pen according to claim 1, wherein said aluminum silicate is added in an amount of from 0.1 to 10% by weight based on the total composition.

3. The ink follower composition for a ballpoint pen according to claim 1, wherein said composition contains silica.

4. The ink follower composition for a ballpoint pen according to claim 1, wherein said composition has a 1-minute value of from 25 to 50 mm as measured with a spreadmeter at about 20° C.

5. A ballpoint pen comprising:

an ink selected from the group consisting of a middle- to high-viscosity ink and a shear-thinning ink;

a ball;

a tip having a top end portion for holding said ball at the top end thereof and for discharging said ink from said top end portion;

an ink container for containing said ink and for supplying said ink to said tip, said ink container communicating with a rear portion of said tip; and an ink follower composition contained in said ink container and following said ink with consumption of said ink, wherein said ink follower composition comprises a hardly volatile liquid and aluminum silicate, and wherein said hardly volatile liquid is selected from the group consisting of dimethyl silicone oil, methvlphenyl silicone oil, alkyl-modified silicone oil and mixtures thereof, or is selected from the group consisting of polybutene, an α-olefin cooligomer and mixtures thereof.

6. The ballpoint pen according to claim 5, wherein said aluminum silicate is added in an amount of from 0.1 to 10% by weight based on the total composition.

7. The ballpoint pen according to claim 5, wherein said composition contains silica.

8. The ballpoint pen according to claim 5, wherein said composition has a 1-minute value of from 25 to 50 mm as measured with a spreadmeter at about 20° C.

* * * * *